Figure 6:
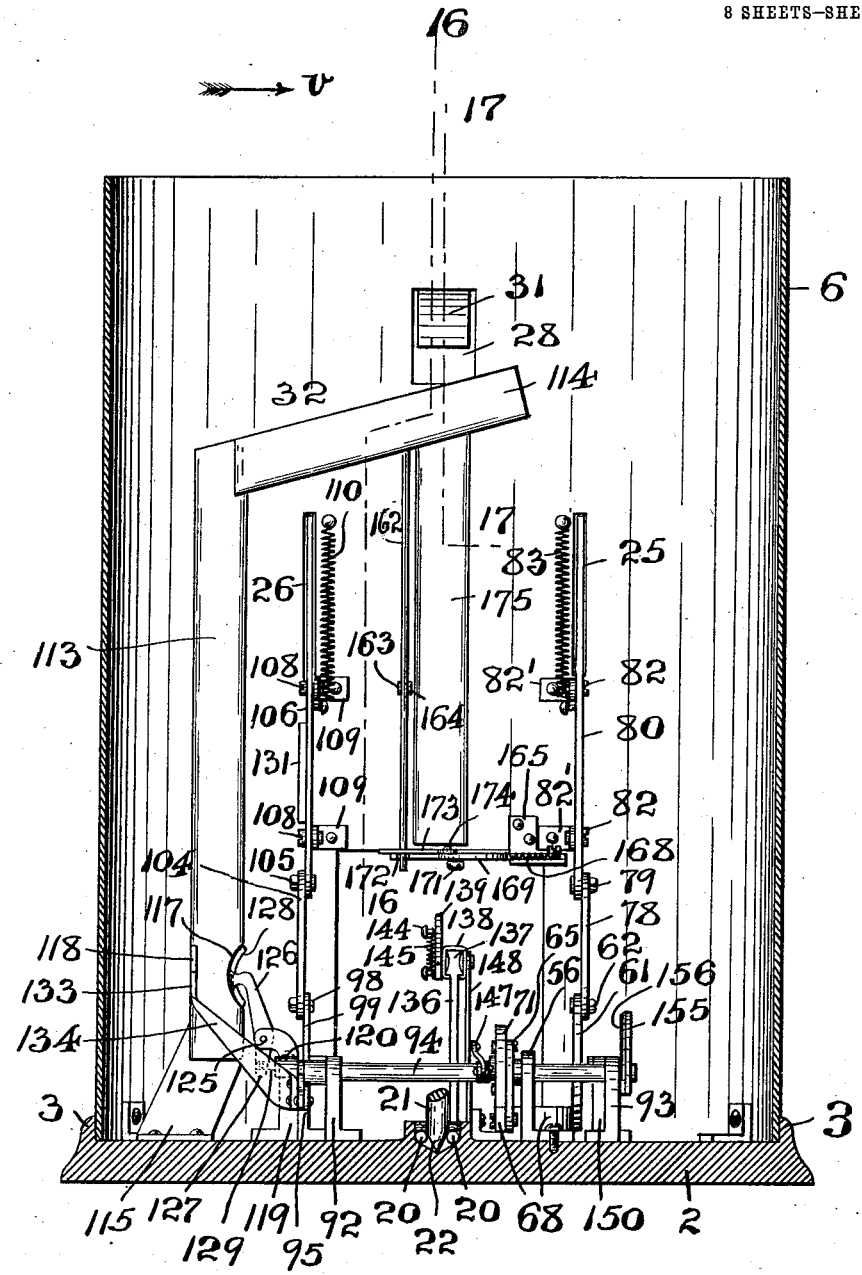

F. G. AXT & B. B. GOODRICH.
VENDING APPARATUS.
APPLICATION FILED JULY 24, 1911.
1,031,682.
Patented July 9, 1912.
8 SHEETS—SHEET 1.
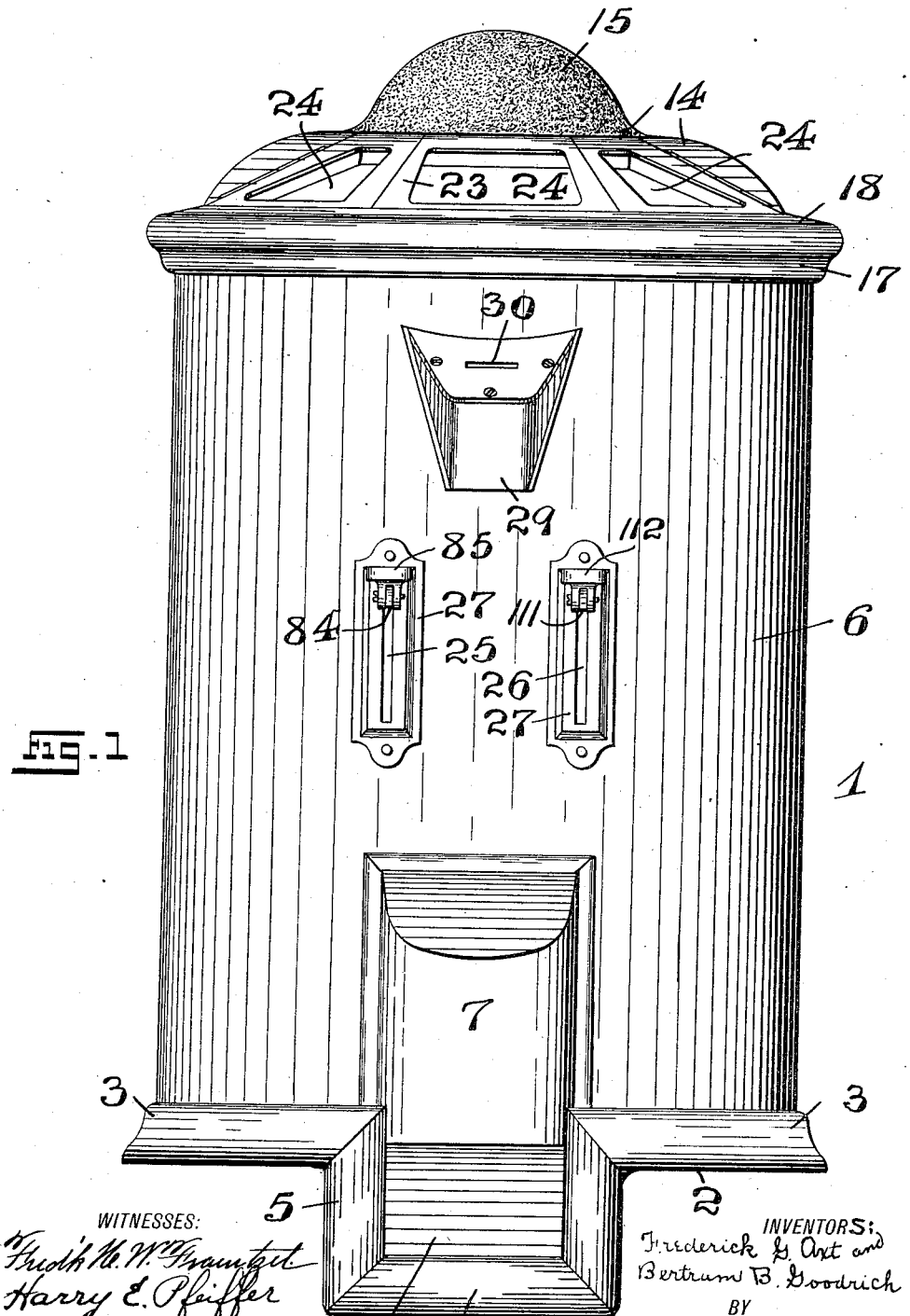

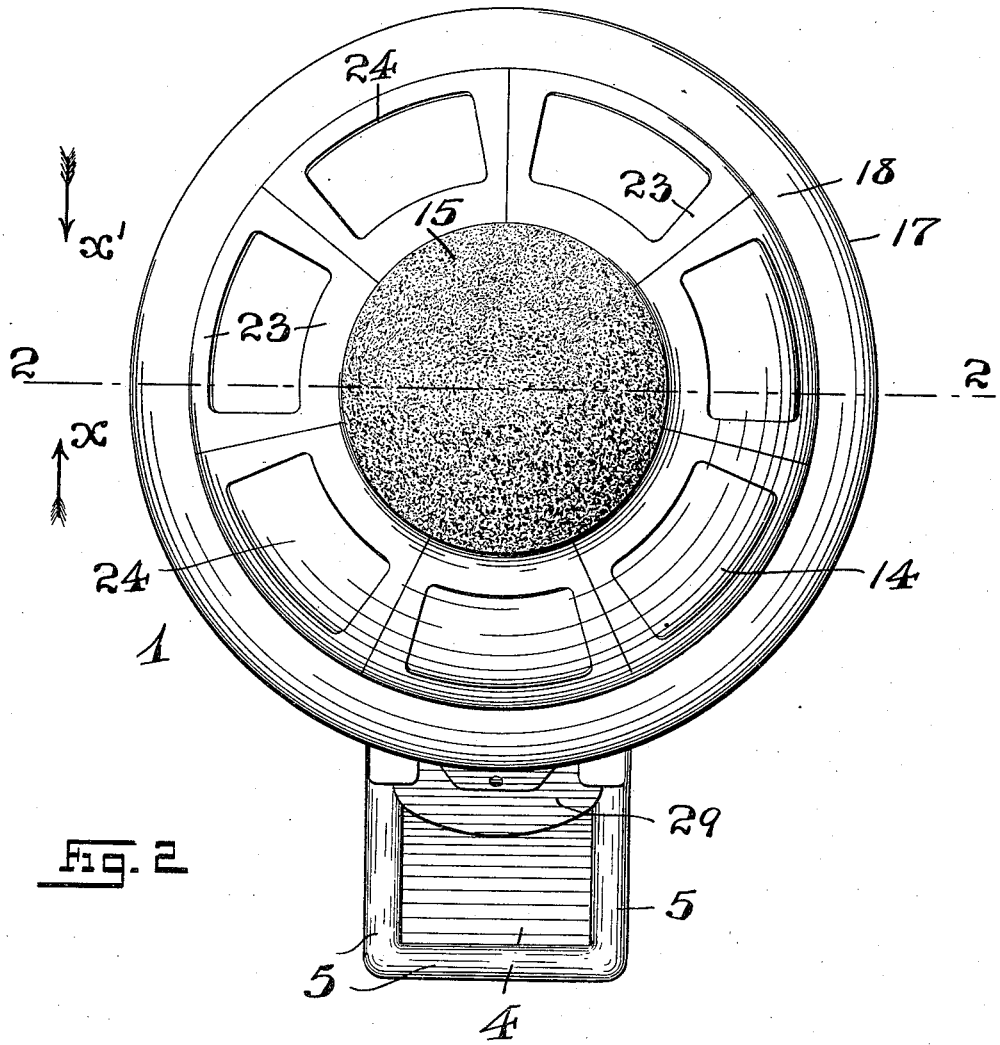

F. G. AXT & B. B. GOODRICH.
VENDING APPARATUS.
APPLICATION FILED JULY 24, 1911.
1,031,682.
Patented July 9, 1912.
8 SHEETS—SHEET 3.
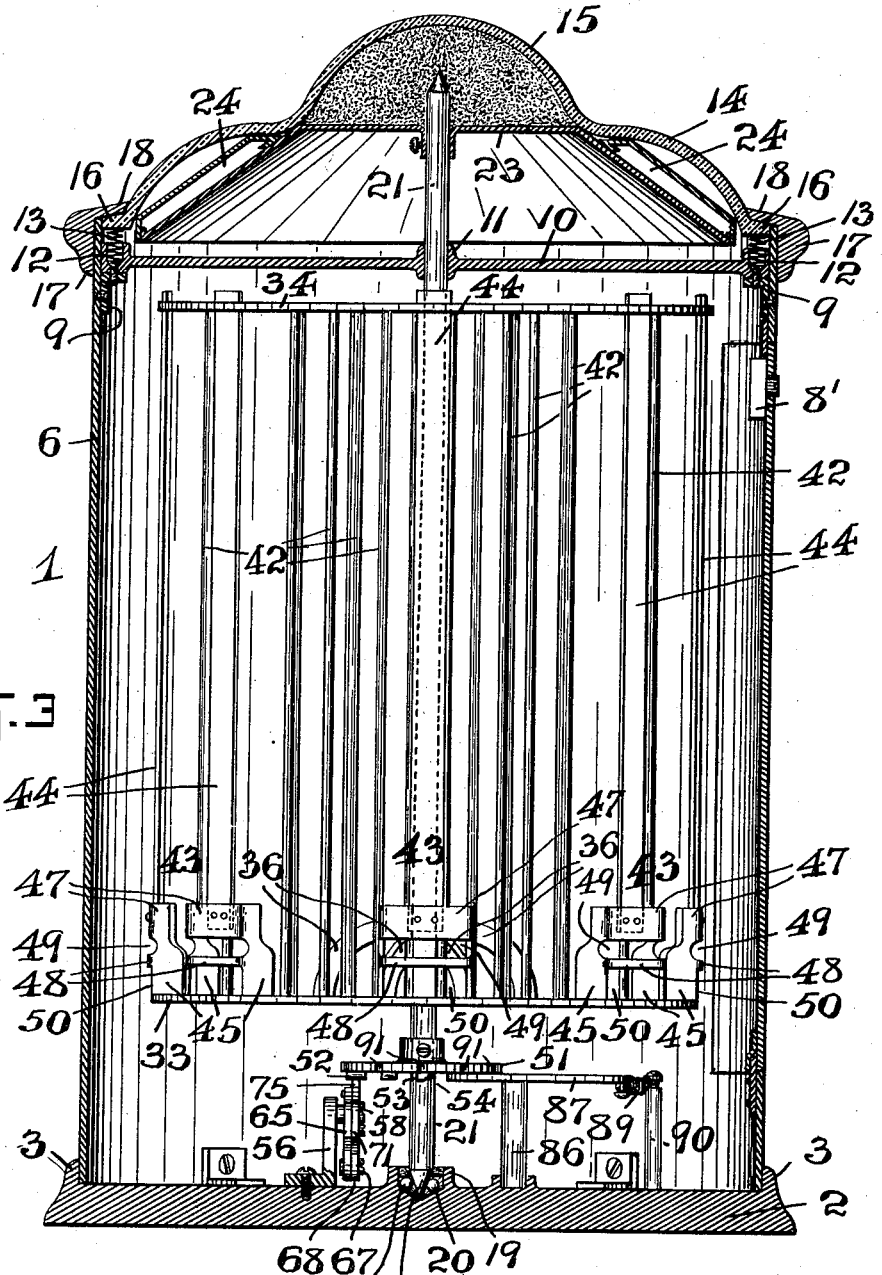

F. G. AXT & B. B. GOODRICH.
VENDING APPARATUS.
APPLICATION FILED JULY 24, 1911.
1,031,682.
Patented July 9, 1912.
8 SHEETS—SHEET 4.
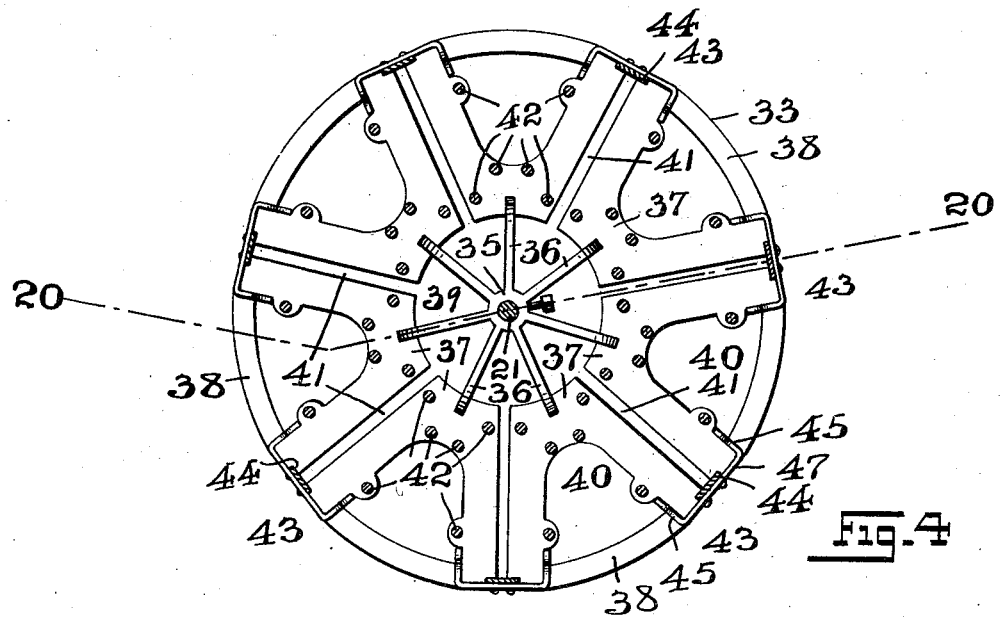
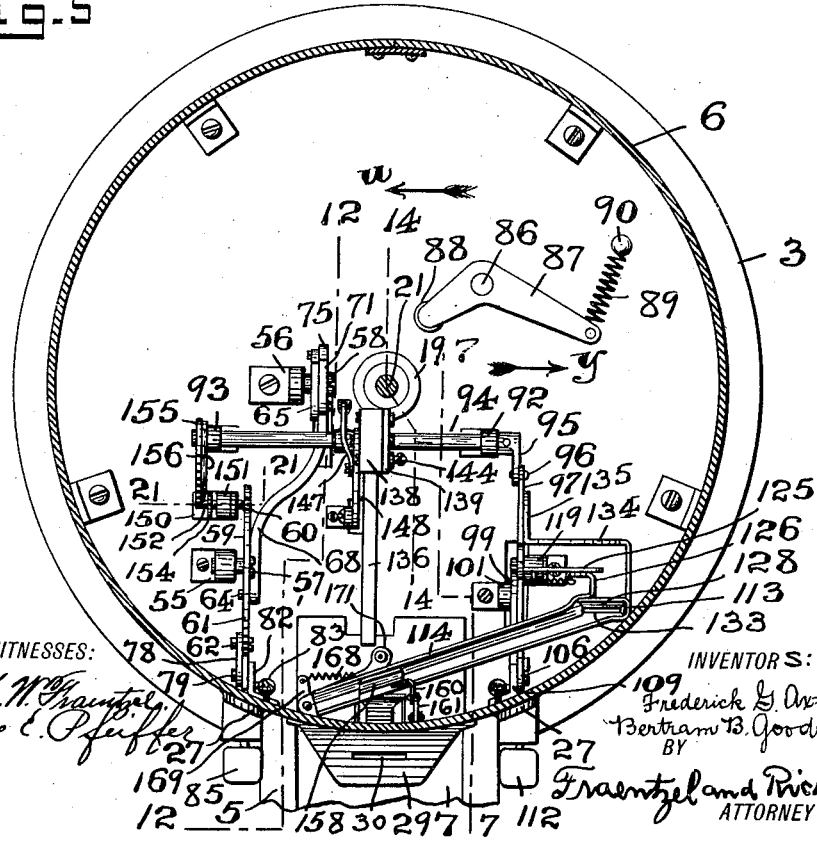
WITNESSES:
INVENTORS:
Frederick G. Axt and
Bertram B. Goodrich
BY
Fraentzel and Richards
ATTORNEYS.

F. G. AXT & B. B. GOODRICH.
VENDING APPARATUS.
APPLICATION FILED JULY 24, 1911.

1,031,682.

Patented July 9, 1912.

8 SHEETS—SHEET 5.

WITNESSES:

INVENTORS:
Frederick G. Axt and
Bertram B. Goodrich
BY
Fraentzel and Richards,
ATTORNEYS.

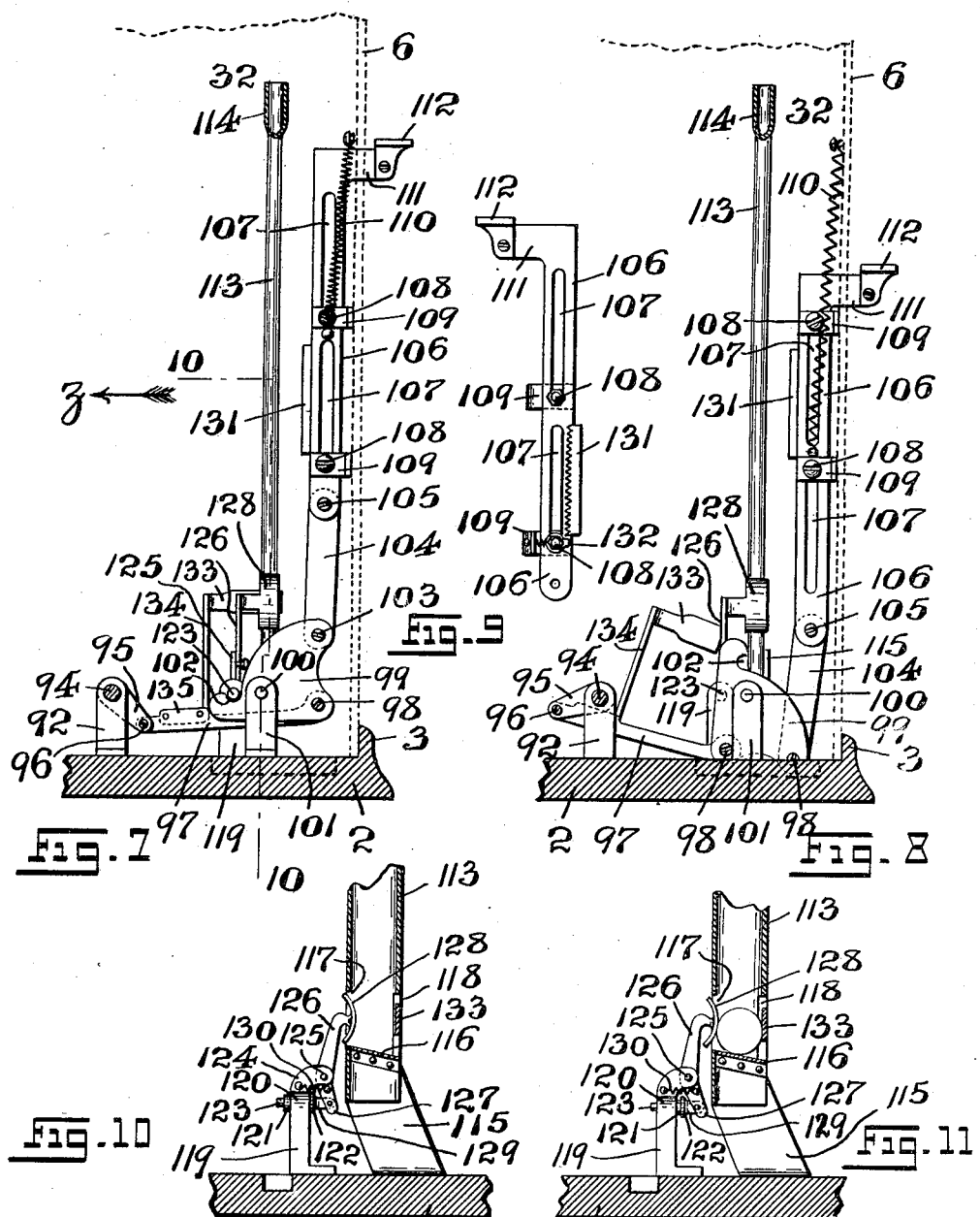

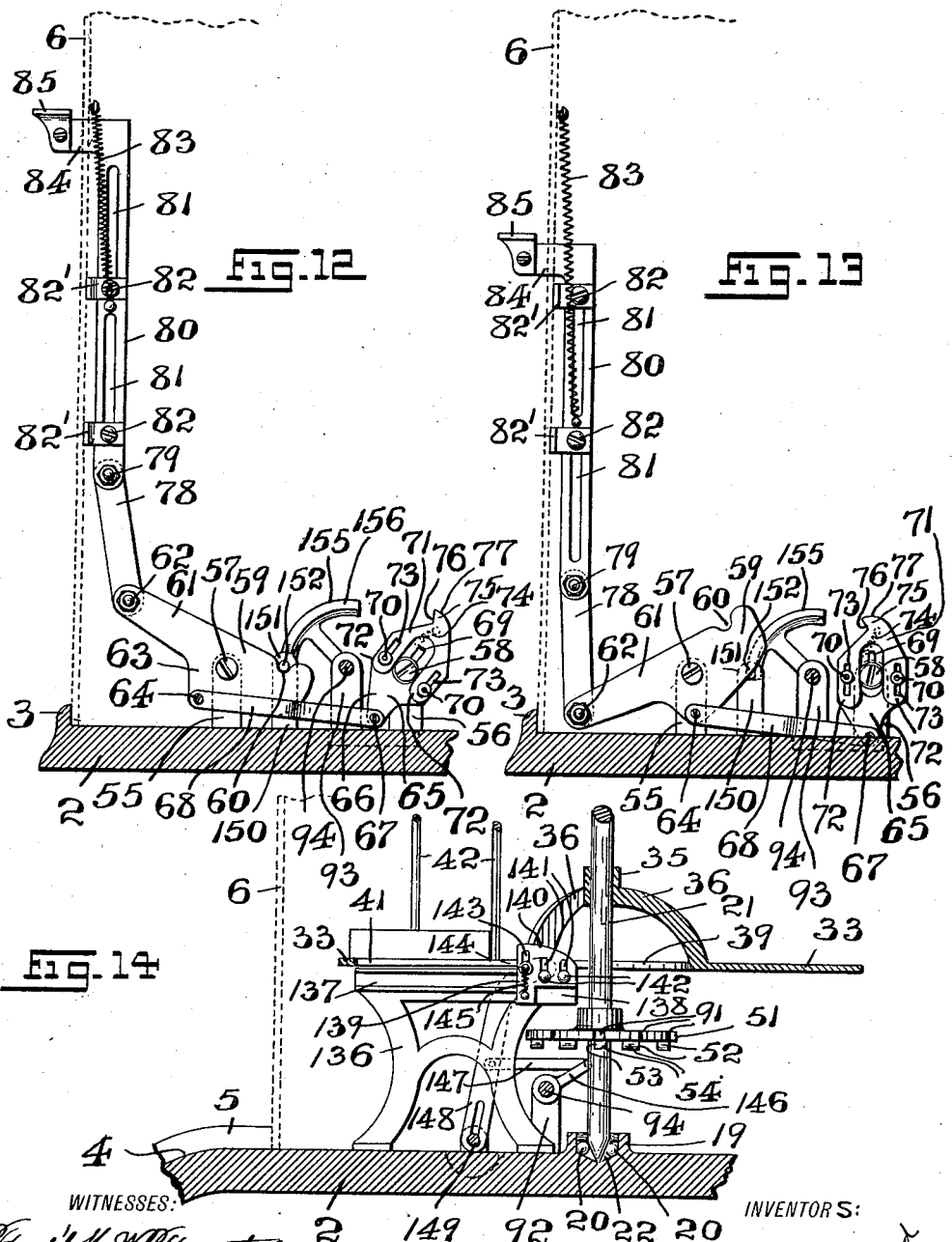

F. G. AXT & B. B. GOODRICH.
VENDING APPARATUS.
APPLICATION FILED JULY 24, 1911.
1,031,682.
Patented July 9, 1912.
8 SHEETS—SHEET 8.
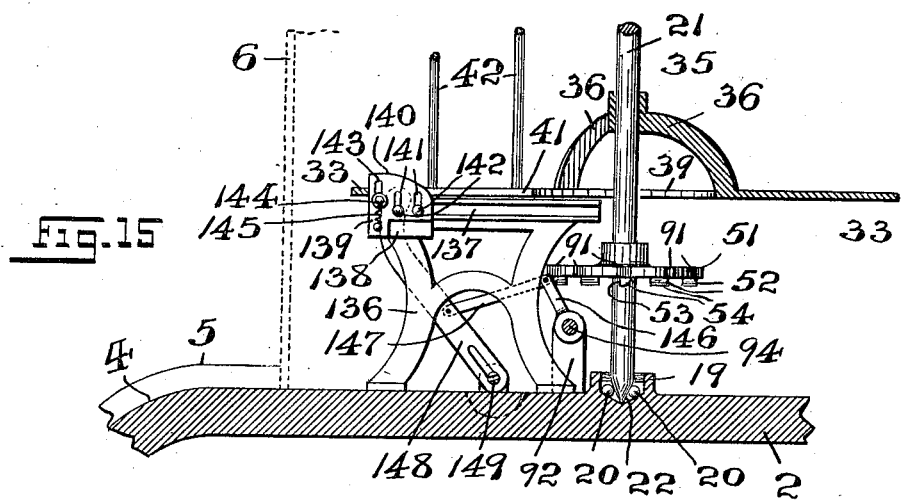

UNITED STATES PATENT OFFICE.

FREDERICK G. AXT AND BERTRAM B. GOODRICH, OF NEWARK, NEW JERSEY, ASSIGNORS OF ONE-THIRD TO WILLIAM J. BIRKEN, OF NEWARK, NEW JERSEY.

VENDING APPARATUS.

1,031,682.  Specification of Letters Patent.  Patented July 9, 1912.

Application filed July 24, 1911. Serial No. 640,053.

*To all whom it may concern:*

Be it known that we, FREDERICK G. AXT and BERTRAM B. GOODRICH, citizens of the United States, residing at Newark, in the county of Essex and State of New Jersey, have invented certain new and useful Improvements in Vending Apparatus; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in vending machines; and, the present invention has reference, more especially, to a vending machine in which there is a vertically mounted and rotary cylinder or frame-work carrying a number of goods or package-containing compartments, adapted to contain different kinds of goods or packages, containing candies, chewing-gum, or the like, the said rotary cylinder or frame-work being normally operative, without having to release any mechanism by means of depositing a coin into the machine or apparatus, so as to successively bring the goods or package-containing compartments of the cylinder or frame-work into position for the delivery of the goods or a package, and the vending machine or apparatus being provided with a coin-receiving slot and a normally locked mechanism adapted to be released by the deposited coin, whereupon the said mechanism is adapted to be operated and performs three principal functions, one of locking the rotary cylinder or frame-work and its goods or package containing compartments against any further rotary movement, another of releasing and actuating a mechanism or means which engages the lowest packages in the compartment held in position back of the delivery-opening of the machine or apparatus, so that the said package is forced from the said compartment and is presented at the said delivery-opening; and, the third function being to return the various mechanisms into their normal initial positions, so that the goods-delivery mechanism is again locked and the rotary cylinder or framework and its goods or package-containing columns are again free to be rotated, so that any desired goods or package-containing column can be rotated or moved in back of the goods-delivery opening prior to the depositing of a coin into the coin-slot for the release of and the next operation of the goods-delivery-mechanism or means.

The invention has for its principal objects to provide a vending apparatus or machine involving the principles stated in the foregoing, and of the general character hereinafter more particularly stated; and, furthermore, to provide a machine or apparatus which is simple in the arrangements and constructions of the several mechanisms and the parts thereof, and the operations and workings of which are most efficiently accomplished.

Other objects of this invention not at this time more particularly enumerated will be clearly understood from the following detailed description of the present invention.

With the various objects of the present invention in view, the said invention consists, primarily, in the novel vending machine or apparatus hereinafter more particularly set forth; and, the invention consists, furthermore, in the arrangements and combinations of the various devices and parts, as well as in the details of the construction of the said parts, all of which will be more fully described in the following specification, and then finally embodied in the clauses of the claims which are appended to and which form an essential part of the said specification.

The invention is clearly illustrated in the accompanying drawings, in which:—

Figure 1 is a front view of a vending machine or apparatus made according to and embodying the principles of the present invention, the usual stand upon which the said apparatus may be mounted, being omitted from said view; and Fig. 2 is a top or plan view of the same. Fig. 3 is a transverse vertical section of the apparatus, the said section being represented as being taken on line 2—2 in said Fig. 2, and looking in the direction of the arrow x in said Fig. 2. Fig. 4 is a horizontal section of the rotary cylinder or frame-work which is provided with the goods or package-containing columns, the vertical shaft or spindle with which the said frame-work is provided being represented in horizontal section; and Fig. 5 is a horizontal sectional representation of the apparatus, with the said rotary cylinder or frame-work omitted from said view, the coin-delivery chute and the various operating mechanism located beneath said rotary cylinder or frame-work being represented in plan view. Fig. 6 is a central transverse sectional representation of the vending machine or apparatus, similar to the section represented in Fig. 3 of the drawings, but looking in the direction of the arrow x in Fig. 2, the upper portion or cover-member of the main casing of the apparatus, as well as the rotary cylinder or frame-work being omitted from said view. Fig. 7 is a detail vertical section, taken on line 7—7 in Fig. 5, looking in the direction of the arrow y in said figure, said view being made on an enlarged scale, and representing the mechanism for releasing the goods-delivery mechanism and simultaneously locking the normally operative cylinder or frame-work mechanism; Fig. 8 is a similar representation of the parts illustrated in said Fig. 7, but representing the said parts in their operated relations; and Fig. 9 is a face view of the actuating lever used with the parts represented in said Figs. 7 and 8, showing the opposite side of said lever, and an arrangement of a toothed rack and a locking pawl or dog used in connection therewith. Fig. 10 is a detail sectional representation, taken on line 10—10 in said Fig. 7, looking in the direction of the arrow z, with certain parts of the mechanism represented in said Fig. 7 omitted from said Fig. 10; and Fig. 11 is a similar view of the said parts represented in said Fig. 10, but showing the relative positions of the said parts, when a coin has been lodged in the bottom of the coin-chute. Fig. 12 is a detail vertical section, taken on line 12—12 in Fig. 5, looking in the direction of the arrow in said figure, and representing on an enlarged scale, part of the mechanism for producing an intermittent rotary movement of the rotary cylinder or frame-work which is provided with the goods or package-containing compartments; Fig. 13 is a similar representation of the parts illustrated in said Fig. 12, but representing the said parts in their operative relations; Fig. 14 is a detail vertical section taken on line 14—14 in said Fig. 5, said view being made on a much larger scale; and Fig. 15 is a similar view of the same parts represented in said Fig. 14, but showing the said parts in their operated positions.

Similar characters of reference are employed in all of the above-described views, to indicate corresponding parts.

Referring now to the several figures of the drawings, the reference-character 1 indicates a suitable casing, said casing comprising a suitably formed base-plate 2, which is surrounded by a marginal flange 3. The said base-plate is formed with a delivery-shelf or member, as 4, which is also surrounded by a marginal flange 5, said flange 5 forming part of the flange 3, substantially as shown in several of the figures of the drawings. Suitably mounted upon the said base-plate 2, and surrounded by the flange 3 is a shell 6, the said shell being provided in its lower front portion, and in alinement with said delivery-shelf or member 4 with the usual opening, over which is suitably arranged and secured a hollow and ornamental casting, as 7. In its side the said shell is provided with an open portion which is closed with a suitably formed door or gate 8, provided with a lock $8^1$, substantially as shown in Fig. 3 of the drawings. Within its upper part, the said shell 6 is provided with brackets 9, upon which is mounted and secured so as to be fitted within said shell, a suitable disk or frame 10, provided with a centrally disposed bearing-portion 11, and with marginal sockets, as 12, in each of which is arranged an upwardly extending coiled compression-spring 13. Resting upon the upper end-portions of said springs 13 is a suitably formed and suitably ornamented glass-closure, as 14, the upper central portion 15 of which is ground, or sand-blasted, so as to be opaque. The said glass-closure or hood 14 is made with a marginal-flange 16, and is suitably secured in position against the compression of the springs 13 by means of the flanged portion 18 of a ring-like element or casting, as 17, which encircles and is suitably mounted upon the upper marginal surface-portion of the shell 6.

The base-plate 2 is provided with a centrally disposed socketed hub 19, in which are arranged a number of anti-friction balls 20, said balls and the hub forming a suitable pedestal-bearing for the lower and preferably pointed end-portion 22 of a vertical shaft or spindle 21. The upper portion of this shaft or spindle is rotatably mounted in the bearing-portion 11 of the fixed disk or frame 10, said upper portion of the shaft or spindle extending above said bearing-portion 11 and terminating in the upper chambered part of the apparatus, formed by the previously mentioned glass-closure 14. Suitably mounted and fixed upon this upper portion of the shaft or spindle 21, so as to rotate with said shaft or spindle, and being located within the chambered part of said glass-closure 14, is a suitably formed element or member, as 23, its form being preferably that of a truncated cone, said element or member 23 being provided upon its outer surface with a series of compartments, as 24, in each of which may be placed, so as to be exposed to view through the non-opaque portions of the glass-closure 14, the different kinds of goods or packages offered for sale to the operator of the vending machine or apparatus. The said shell or casing 6 is formed with a pair of vertical slots 25 and 26 through which the manipulating levers of the respective mechanisms to be presently more fully described extend and are adapted to move up and down, as will hereinafter appear. The said slots 25 and 26 are preferably surrounded by suitably formed frames, as 27. In its upper front portion, the said shell or casing 6 is provided with another suitably formed opening 28, the said opening having arranged thereover a suitably formed coin-receiver in the form of a hollow casting 29 which is provided with a coin-receiving slot 30, and an inwardly extending coin-directing chute 31 which passes through the opening 28 and terminates directly in front of the main coin-delivering chute 32 of the vending machine or apparatus.

The previously mentioned rotary cylinder or framework, containing the various goods or package-containing compartments, as will be seen more especially from Figs. 3 and 4 of the drawings, consists of the said shaft or spindle 21, a lower disk-shaped element 33, and an upper disk-shaped element 34. The said element 33 consists, essentially, of a spider-like central member formed with a hub 35 mounted and suitably secured upon said spindle or shaft, and a series of curved arms or ribs 36, extending radially from the said hub 35, said arms or ribs 36 having suitably connected with their lower end-portions, and said arms or ribs carrying upon said end-portions, radially extending supporting members, as 37, which are preferably of the configuration shown in Fig. 4 of the drawings, the said supporting members 37 being suitably connected by means of the marginal arc-shaped portions 38. In this manner, the disk-like member 33 is provided, the said member being formed with the openings 39 and 40, and the radial slots 41, substantially as shown. The upper disk-shaped element 34 may be merely a sheet-metal plate, said plate being connected with the said supporting members 37 by means of vertical tie-rods 42. Between each set of six of such rods, projecting upwardly from each pair of legs of two adjacent supporting members 37, so as to be supported upon the said legs and arranged over the radial slot 41 between said legs, are the columns of goods or packages, such as chewing gum, candy, etc., each column of such packages being retained between said rods at the sides and the back; and, at the front by means of suitably formed bracket-like devices 43 and an upwardly extending flat bar or plate 44 connected with each device 43. Each bracket-like device consists of a pair of side-plates 45 resting by means of their lower edges upon the marginal arc-shaped portions 38 adjacent to the marginal edges of the legs of each pair of adjacent supporting members 37, the said devices being removably held in place by means of lugs 46 which extend downwardly from the lower edges of said side-plates 45, said side-plates 45 being connected by a pair of front-plates or bars 47 and 48, providing a pair of open parts 49 and 50. Suitably connected with each front plate or bar 47 is the previously mentioned and upwardly extending flat bar or plate 44, the upper end-portion of each bar or plate 44 extending into and being removably arranged in a correspondingly formed hole or opening in the sheet-metal disk 34. In order to place the columns of packages upon each pair of legs of two adjacent supporting members, the respective bracket-like devices 43 and the plates 44 connected therewith can be readily removed, and a column of the required number of packages can be placed between the exposed rods 42, it being understood that the rotary cylinder or frame-work has been moved in front of the opened side-portion of the shell or casing 6 from which the door or gate 8 has been removed by the person carrying the key. The column of packages having been placed between said tie-rods, the bracket-like device 43 and its flat bar or plate 44 are replaced, so that the device 43 embraces the lower package or packages of the column, and the bar or plate 44 extends along the front of said column of packages. In this manner, by intermittently rotating the cylinder or frame-work in position back of the opened part of the shell or casing 6, column after column of the packages can be placed in the rotary cylinder or frame-work, and when the cylinder or frame-work has been replenished with the requisite number of columns, the door or gate 8 is replaced and locked, whereupon the machine or apparatus is ready for the sale of the packages from any one of the columns of packages, in the manner to be presently more fully described.

The series of compartments 24 of the previously mentioned element or member 23 affixed to the spindle or shaft 21 corresponds in number and position to the number and positions of the series of columns of packages arranged in the rotary cylinder or frame-work just described, so that the purchaser may have his or her choice by first inspecting the packages permanently located in the respective compartments 24 and displayed through the glass-closure; and, after having made a choice, by means of the mechanism now to be described, the cylinder or frame-work is rotated into the proper position, so as to bring the selected compartment to the front of the machine and in alinement, vertically, above the goods-delivery opening of the machine or apparatus. This mechanism for initially producing this intermittent rotary movement of the goods-containing cylinder or frame-work consists, essentially, of a ratchet-disk 51 which is suitably mounted and secured upon the shaft or spindle 21 at a point below the lower disk-shaped element or member 33, said ratchet-disk 51 being provided upon its under surface with downwardly projecting ratchet-teeth or lugs 52, each tooth 52 being made with a vertical and straight face 53 and a chamfered riding surface 54. Suitably mounted upon the base-plate 2 of the machine or apparatus are a pair of brackets or posts, as 55 and 56, the bracket or post 55 having a pivot or pin 57, and the bracket or post 56 being provided with a pivot or pin 58. Pivotally arranged upon said pivot or pin 57 is an oscillating member or rock-plate 59, which is formed in its upper marginal edge with a depression or recess 60, the purpose of which will be hereinafter more fully described. The said rock-plate 59 is also made with an arm-like extension 61, formed with a pivot or pin 62, and with a lower extension, as 63, which has a pivot or pin 64. Pivotally arranged upon the pivot or pin 58 of the bracket or post 56 is a crank 65 formed with an extension, as 66, having a pivot or pin 67, with which is pivotally connected the one end-portion of a link 68, said link being pivotally connected at its other end-portion with the pivot or pin 64 of the extension 63 of the rock-plate 59. The said crank 65, as shown, may be provided with a slot 69 by means of which it is arranged upon the said pivot or pin 58, the latter preferably being a screw, whereby the crank can be adjusted with relation to the bracket or post 56 and the link 68. The said crank 65 is also provided with laterally extending studs 70 by means of which an actuating dog or pawl 71 is slidably secured upon the one side of the said crank, as will be clearly evident from an inspection of Figs. 12 and 13 of the drawings. The said sliding dog or pawl 71 is of a U or yoke-shaped configuration, the leg-portions 72 of the main body of the dog or pawl being slotted, as at 73, so that the said dog or pawl, while it oscillates with the crank 65, has an independent sliding movement upon the said studs 70 and upon the side of the crank, against the action of a small coiled spring 74 between the said crank and the dog or pawl, which spring returns the sliding dog or pawl into its normal initial position shown in Fig. 12, after the rotary movement of the goods-containing cylinder or frame-work. The said sliding dog or pawl 71 has a nosing or projection, as 75, formed with a straight surface 76 adapted to actively engage with the straight surface 53 of one of the ratchet-teeth or lugs 52, when the crank 65 is moved into the position indicated in Fig. 13, so as to cause a rotary movement of the said goods or package-containing cylinder or frame-work, as will be evident. The said nosing or projection 75 is also made with a chamfered surface, as 77, which rides over the chamfered riding surface 54 of the just-engaged ratchet-tooth or lug 52, when the mechanism for actuating the crank 65 is released, and for an instance while said chamfered surfaces are brought into engagement distends the coils of the spring 74, said spring immediately after said chamfered surfaces have passed over each other, returning the said sliding dog or pawl 71 into its normal initial position represented in said Fig. 12 of the drawings. To actuate the said oscillating member or rock-plate 59, a link 78 is pivotally connected with the pivot or pin 62 of the arm-like extension 61, said link 78 being pivotally connected at its other end, by means of a pivot or pin 79, with a vertically moving reciprocatory slide, as 80. This slide has an elongated opening or slot 81 in which are arranged the shanks of screws or pins 82 with which certain brackets 82[1], or other fastening devices which are suitably secured upon the inner face of the shell or casing 6, are provided, so that the said slide may be capable of its reciprocating movements. That the said slide may be pushed or forced into the lowered position shown in said Fig. 13, against the action of a coiled spring 83 which returns these parts to their normal initial positions, after operation as will be clearly evident, the said slide is made with a forwardly extending member 84 which projects through the slot or opening 25 in the shell or casing 6, said member 84 being provided with a suitable finger-piece 85 for the depression of the slide. The operation of this mechanism will be clearly understood, the nosing or projection 75 being caused to engage with one of the ratchet-teeth or lugs 52 of the ratchet-disk 51, so that the rotary cylinder or frame-work may be intermittently rotated, at will, as will be clearly evident.

That the rotary cylinder or frame-work may be positively maintained or held in its rotated position, after each downward stroke of the slide 80, the base-plate 2 is provided with a post 86, upon which is arranged in an oscillatory manner a bell-crank 87, which is provided at one end with a roller 88, and at its other end with a coiled spring 89, attached to a pin or post 90 upon said base-plate 2, said spring 89 causing the roller 88 to be brought into rolling contact with the marginal edge of the previously mentioned ratchet-disk 51, and at the end of each stroke of the slide 80, the roller 88 being moved into one of a number of depressions 91 in the said edge of the disk 51, so that the goods or package-containing cylinder or frame-work, at the end of each stroke of the slide 80 will have moved only the distance required, and is held against further rotary movement, until the slide 80 is again depressed, whereupon the next partial rotary movement of the goods or package-containing cylinder can again be produced.

Coming now to the coin-operated mechanism, this mechanism is illustrated more particularly in Figs. 5, 7, 8, 9, 10 and 11, of the drawings, and the same comprises a pair of brackets or posts, as 92 and 93 which are suitably mounted upon the said base-plate 2, said brackets having bearing-portions in which is oscillatorily supported a rock-shaft 94. This shaft 94 is provided at one end thereof with a crank 95, with which is pivotally connected by means of a pivot or pin 96, a link 97, said link being also pivotally connected by means of a pivot or pin 98 with a rock-plate 99. This rock-plate is pivotally mounted upon a pivot or pin 100 carried by a bracket or post 101 which is also suitably secured upon said base-plate 2, said rock-plate 99 being provided in its upper marginal edge-portion with a recess or depression 102, the purpose of which will be presently more fully described. The said rock-plate 99 is also provided with another pivot or pin 103, with which is pivotally connected a link 104, said link 104 being pivotally connected by means of a pivot or pin 105, with a vertically moving reciprocatory slide, as 106. This slide has an elongated opening or slot 107 in which are arranged the shanks of screws or pins 108 with which certain brackets 109, or other fastening devices, which are suitably secured upon the inner face of the shell or casing 6, are provided, so that the said slide may be capable of its reciprocatory movements. That the said slide 106 may be pushed or forced into the lowered position shown in Fig. 8 of the drawings, against the action of a coiled spring 110 which returns these parts to their normal initial positions, after operation, the said slide is made with a forwardly extending member 111 which projects through the slot 26 in the shell or casing 6, said member being provided with a suitable finger-piece 112 for the depression of the slide.

The operation of the mechanism which is mainly to oscillate the rock-shaft 94, will be clearly understood from an inspection of Figs. 7 and 9 of the drawings. Normally, however, this mechanism is locked against movement until a coin of the proper denomination is inserted in the coin-receiving slot 30 of the hollow casting 29, and directed by means of the coin-directing chute 31 into the main coin-chute 32. This chute consists, essentially of two main parts 113 and 114, the part 113 being made in the form of a vertical piece of tubing of oblong cross-section, said part being supported in its vertical position by means of a bracket 115 which is suitably secured and mounted upon the base-plate 2. The lower end-portion of said tubing 113 is closed by means of a plate, as 116, which inclines in a downward direction from an opening 117 in the one narrow edge of the tubing to a coin-delivery opening 118 in the opposite narrow edge of said tubing. Suitably connected with the upper end-portion of the said part 113 is the part 114, said part being made in the form of an inclined duct, preferably made V-shaped in cross-section, and the higher portion of said part or duct 114 terminating directly back of the opening 28 in the shell or casing 6, and beneath the delivery-end of the coin-directing chute 31, substantially as shown in Fig. 6 of the drawings.

The means for locking the rock-shaft operating-mechanism against movement until a coin has been deposited in the lower portion of the part or tube 113, and rests upon the plate 116, is clearly illustrated in Figs. 10 and 11 of the drawings. This means consists, essentially, of a bracket or post 119 which is suitably mounted upon the base-plate 2, said bracket or post 119 being provided with a bearing-portion 120 in which is slidably arranged a pin 121. This pin 121 is provided with an annular flange 122 bearing normally against one side of the said bracket or post 119, and has a reduced end-portion, as 123, which normally extends into and rests within the previously mentioned recess or depression 102 in the upper marginal edge of the rock-plate 99, so as to positively prevent any movement of said rock-plate and the parts connected therewith. The said bracket or post 119 is provided with an arm, as 124, with which is pivotally connected, by means of a pin or pivot 125, a bell-crank comprising the arm-members 126 and 127. The arm 126 is provided with a curved plate 128 which normally closes the opening 117 of the part or tubing 113, substantially in the manner illustrated in Fig. 7 of the drawings, and the arm 127 of said bell-crank is pivotally connected with the end-portion 129 of the pin 121, substantially as shown, a spring, as 130, being arranged between and connected with the arm 124 and the arm-member 127 to normally retain these parts in their respective positions for closing the opening 117 and locking the rock-shaft operating-mechanism against movement. As the coin has become lodged in the lower portion of the part or tube 113, the edge of the coin bears upon the convex surface of the closing plate 128 and moves the same slightly away from the opening 117, thus actuating the bell-crank and causing the end-portion 123 of the pin 121 to be withdrawn from its holding or locking engagement with the recess or depression 102 in the upper marginal edge of the rock-plate 99, the coils of the spring 130 becoming distended, and the parts remaining in the positions shown in Fig. 11 of the drawings, until the coin has passed from the opening 118 of the part or tube 113. The rock-shaft operating-mechanism can now be operated, by the depression of the slide 106, as will be clearly understood, thus permitting the rock-shaft 94 to actuate the package-ejecting mechanism in the manner to be presently more fully described.

In order that the operator, when he has begun to depress the slide 106, will force the said slide in a downward direction its entire length, so as to insure the complete operation of the machine, the said slide 106 is provided with a serrated plate 131, and a spring-maintained pawl or dog 132, arranged upon one of the screws or pins 108, substantially as shown in Fig. 9 of the drawings, the said spring-maintained and oscillatory arranged pawl or dog 132 readily passing the serrations or teeth of the plate 131 during the rapid downward or upward stroke of the slide 106, but engaging with the said serrations or teeth of the plate 131, in the usual and well-known manner, to prevent the return movements of the said slide 106, when the slide is only slowly operated, thereby compelling the operator to move the said slide 106 in a downward direction to its fullest distance, in order to obtain the desired package or goods from the machine or apparatus. After the coin has become located in the lower portion of the part of the tube 113, it is retained in the position shown in Fig. 11 of the drawings by the previously mentioned closing plate 128, and a second plate 133 which is arranged in the said opening 118 of the tube 113; but, being connected with the link 97 by means of an arm 134 and the part 135, said closing plate 133 is withdrawn from the said opening 118 to permit the coin to roll through the said opening 118 from the said tube 113, immediately upon the actuation of the mechanism shown in Fig. 7, to the position of the parts thereof shown in Fig. 8 of the drawings, as will be clearly evident from an inspection of said Figs. 7 and 8.

The mechanism for ejecting the lower package from the column of goods or packages which have been previously rotated into place is shown more particularly in Figs. 5, 6 and 15 of the drawings, and the same consists, essentially, of a suitably constructed table 136, which is suitably mounted upon the base-plate 2, and is formed in its upper part with a guide-portion 137. Embracing the said guide-portion 137 and slidably arranged thereon, is a slide 138, the said slide 138 being provided with a suitably constructed package-engaging ejector-plate normally arranged in the open space 39 and being adapted to be moved from said space into the respective radial slot of the lower disk-shaped element or plate 33 of the goods-containing cylinder or frame-work hereinbefore mentioned, the said plate 139 in passing into and through the slot 41 engaging with the lowest package and forcing it into the package or goods-discharge opening of the shell or casing 6. That the said disk-like member 33 may be readily passed over the ejector-member 139, as the various devices and parts return to their normal initial position, the said ejector-plate is provided with an upper curved edge-portion 140, and a series of slots 141 into which extend pins 142 upon which said plate 139 is slidably arranged, so as to become depressed as the disk-shaped element or plate 33 moves over same. The plate 139 is provided with another slot 143 into which extends a pin 144, a spring 145 being employed for forcing the said plate in an upward direction and into the said open space 39 in the said lower disk-like member 33, ready for the next forward movement of the slide 138 and plate 139, as will be clearly evident. In order that a forward sliding movement of the said slide 138 and its plate 139 is produced, as the slide 106 is depressed, there is secured to the previously mentioned rock-shaft an arm 146 with which is pivotally connected a link 147, and by means of which, during the oscillatory movements of the rock-shaft 94, a bar or rod 148, which is pivotally connected to the base-plate 2, as at 149, at its one end-portion, and at its other end-portion with the slide 138, is caused to rock, so as to move the slide 138 and its ejector-plate in such forward direction, and thereby eject the lowest package which is presented in the path of the moving ejector-plate 139. The previously mentioned spring 110 which is connected with the slide 106, as will be understood, returns all of these parts to their normal initial position, as soon as the operator removes the pressure from the finger piece connected with the said slide 106.

While the said above described operations have been produced, the mechanism by means of which the rotary goods or package-containing cylinder or frame-work has been moved in to the proper position is simultaneously locked against any further movement until the various parts of the coin-actuated mechanism have again returned to their normal initial positions. The means for thus locking the mechanism by means of which the goods or package-containing cylinder or frame-work is rotated, is illustrated in Figs. 5, 12, 13 and consists, essentially, of a bracket or post 150, formed with a laterally extending barrel or tubular member, as 151, in which is slidably arranged a lock-pin 152, retained in its normal initial position, by the action of a coiled spring 153. The one end-portion of said pin 152 extends from said barrel or tubular member 151 and is in alinement with the recess or depression 60 of the previously mentioned rock-plate 59. The other end-portion of the lock-pin 152 extends from the other end of said barrel or tubular member 151 and is provided with an annular flange 154, or the like, located a short distance from said end of the barrel or tubular member 151, so as to act as a stop to limit the sliding movement of the lock-pin 152. To actuate the said lock-pin and to bring its other end-portion in locked and holding engagement with the recess or depression 60 of the rock-plate 59, immediately upon the depression of the slide 106, there is secured upon the rock-shaft 94 a sector 155, formed with a cam-like surface 156 which slides against the flanged end-portion of the said lock-pin 152, so as to move the same laterally within the barrel or tubular member 151 and cause its other end to slide into the recess or depression 60, as will be clearly evident. As soon as the slide-bar 106 is released, and the various parts return to their normal initial positions, the spring 153 returns the lock-pin 152 again to its former position and disengaged from its holding engagement with the rock-plate 59, so that the goods or package-containing cylinder or frame-work can once more be rotated, in the manner hereinbefore described.

We are fully aware that changes may be made in the general arrangements and combinations of the various devices and parts, as well as in the details of the construction of the said parts, without departing from the scope of the present invention as set forth in the foregoing specification and as defined in the clauses of the claims which are appended to the said specification. Hence, we do not limit our invention to the exact arrangements and combinations of the devices and parts as described in the said specification, nor do we confine ourselves to the exact details of the construction of the said parts as illustrated in the accompanying drawings.

We claim:—

1. A vending machine comprising a base-plate and a shell thereon, a goods or package-containing frame-work rotatably mounted upon said said base-plate, a ratchet-disk connected with said frame-work, a rock-plate pivotally mounted upon said base-plate, a spring-controlled slide for actuating said rock-plate, a crank pivotally mounted upon said base-plate, a link between said crank and said rock-plate, and a pawl slidably connected with said crank, said pawl being adapted to be brought into engagement with said ratchet-disk for producing intermittent rotary movements of the goods or package-containing frame-work.

2. A vending machine comprising a base-plate and a shell thereon, a goods or package-containing frame-work rotatably mounted upon said base-plate, a ratchet-disk connected with said frame-work, a rock-plate pivotally mounted upon said base-plate, a spring-controlled slide for actuating said rock-plate, a crank pivotally mounted upon said base-plate, a link between said crank and said rock-plate, studs extending from one side of said crank, a U-shaped pawl having slotted leg-portions slidably arranged upon said studs, a spring between the said crank and said pawl, and a nosing upon said pawl adapted to be brought into engagement with said ratchet-disk for producing intermittent rotary movements of the goods or package-containing frame-work.

3. A vending machine comprising a base-plate and a shell thereon, a goods or package-containing frame-work rotatably mounted upon said base-plate, a ratchet-disk connected with said frame-work, a rock-plate pivotally mounted upon said base-plate, a spring-controlled slide for actuating said rock-plate, a crank pivotally mounted upon said base-plate, and between said crank and said rock-plate, studs extending from one side of said crank, a U-shaped pawl having slotted leg-portions slidably arranged upon said studs, a spring between the said crank and said pawl, and a nosing upon said pawl adapted to be brought into engagement with said ratchet-disk for producing intermittent rotary movements of the goods or package-containing frame-work, and means adapted to be brought into engagement with the said rock-plate for locking said plate against movement.

4. A vending machine comprising a base-plate and a shell thereon, a goods or package-containing frame-work rotatably mounted upon said base-plate, a ratchet-disk connected with said frame-work, a rock-plate pivotally mounted upon said base-plate, a spring-controlled slide for actuating said rock-plate, a crank pivotally mounted upon said base-plate, a link between said crank and said rock-plate, studs extending from one side of said crank, a U-shaped pawl having slotted leg-portions slidably arranged upon said studs, a spring between the said crank and said pawl, and a nosing upon said pawl adapted to be brought into engagement with said ratchet-disk for producing intermittent rotary movements of the goods or package-containing frame-work, and means adapted to be brought into engagement with the said rock-plate for locking said plate against movement.

5. A vending machine comprising a base-plate and a shell thereon, a goods or package-containing frame-work rotatably mounted upon said base-plate, a ratchet-disk connected with said frame-work, a rock-plate pivotally mounted upon said base-plate, said rock-plate being provided in its marginal edge-portion with a pin-receiving depression, a spring-controlled slide for actuating said rock-plate, a crank pivotally mounted upon said base-plate, a link between said crank and said rock-plate, a pawl slidably connected with said crank, said pawl being adapted to be brought into engagement with said ratchet-disk for producing intermittent rotary movements of the goods or package-containing frame-work, a spring-controlled lock-pin adapted to enter said pin-receiving recess in said rock-plate, and means for actuating said lock-pin.

6. A vending machine comprising a base-plate and a shell thereon, a goods or package-containing frame-work rotatably mounted upon said base-plate, a ratchet-disk connected with said frame-work, a rock-plate pivotally mounted upon said base-plate, said rock-plate being provided in its marginal edge-portion with a pin-receiving depression, a spring-controlled slide for actuating said rock-plate, a crank pivotally mounted upon said base-plate, a link between said crank and said rock-plate, a pawl slidably connected with said crank, said pawl being adapted to be brought into engagement with said ratchet-disk for producing intermittent rotary movements of the goods or package-containing frame-work, a spring-controlled lock-pin adapted to enter said pin-receiving recess in said rock-plate, a rock-shaft mounted upon said base-plate, a sector upon said shaft having a cam-like surface adapted to engage the end of said lock-pin so as to move said pin into said pin-receiving recess, and means for actuating said rock-shaft.

7. A vending-machine comprising a base-plate and a shell thereon, a goods or package-containing frame-work rotatably mounted upon said base-plate, a ratchet-disk connected with said frame-work, a rock-plate pivotally mounted upon said base-plate, said rock-plate being provided in its marginal edge-portion with a pin-receiving depression, a spring-controlled slide for actuating said rock-plate, a crank pivotally mounted upon said base-plate, a link between said crank and said rock-plate, studs extending from one side of said crank, a U-shaped pawl having slotted leg-portions slidably arranged upon said studs, a spring between said crank and said pawl, a nosing upon said pawl adapted to be brought into engagement with said ratchet-disk for producing intermittent rotary movements of the goods or package-containing frame-work, a spring-controlled lock-pin adapted to enter said pin-receiving recess in said rock-plate, and means for actuating said lock-pin.

8. A vending machine comprising a base-plate and a shell thereon, a goods or package-containing frame-work rotatably mounted upon said base-plate, a ratchet-disk connected with said frame-work, a rock-plate pivotally mounted upon said base-plate, said rock-plate being provided in its marginal edge-portion with a pin-receiving depression, a spring-controlled slide for actuating said rock-plate, a crank pivotally mounted upon said base-plate, a link between said crank and said rock-plate, studs extending from one side of said crank, a U-shaped pawl having slotted leg-portions slidably arranged upon said stud, a spring between said crank and said pawl, a nosing upon said pawl adapted to be brought into engagement with said ratchet-disk for producing intermittent rotary movements of the goods or package-containing frame-work, a spring-controlled lock-pin adapted to enter said pin-receiving recess in said rock-plate, a rock-shaft mounted upon said base-plate, a sector upon said shaft having a cam-like surface adapted to engage the end of said lock-pin so as to move said pin into said pin-receiving recess, and means for actuating said rock-shaft.

9. In a vending machine, mechanism for producing intermittent rotary movements of a goods or package-containing frame-work, consisting of an oscillatory rock-plate, a spring-controlled reciprocatory slide, a link between said rock-plate and said slide, an oscillatory dog for actuating and producing the rotary movements of said frame-work, and a link between said rock-plate and said dog, substantially as and for the purposes set forth.

10. In a vending machine, mechanism for producing intermittent rotary movements of a goods or package-containing frame-work, consisting of an oscillatory rock-plate, a spring-controlled reciprocatory slide, a link between said rock-plate and said slide, a pivotally arranged crank, a link between said crank and said rock-plate, studs extending from one side of said crank, a U-shaped pawl having slotted leg-portions slidably arranged upon said studs, a spring between said crank and said pawl, and a nosing upon said pawl, substantially as and for the purposes set forth.

11. In a vending machine, a package-ejecting mechanism comprising a table formed with a guide-portion, a slide mounted thereon, pins extending from said slide, and an ejector-plate provided with elongated slots by means of which said ejector-plate is slidably connected with said slide, said ejector-plate having an upper curved marginal edge-portion, and a spring attached at one end to said ejector-plate and at its other end said spring being attached to one of said pins, substantially as and for the purposes set forth.

In testimony that we claim the invention set forth above we have hereunto set our hands this 15th day of July, 1911.

FREDERICK G. AXT.
BERTRAM B. GOODRICH.

Witnesses:
FREDK. C. FRAENTZEL,
FREDK. H. W. FRAENTZEL.

Copies of this patent may be obtained for five cents each, by addressing the "Commissioner of Patents, Washington, D. C."